United States Patent [19]

Moir et al.

[11] Patent Number: 5,781,374
[45] Date of Patent: Jul. 14, 1998

[54] DISC CENTERING DEVICE FOR A DISC DRIVE

[75] Inventors: Michael Bruce Moir, Newbury Park; Richard Gene Krum, Thousand Oaks, both of Calif.

[73] Assignee: Seagate Technology, Inc., Scotts Valley, Calif.

[21] Appl. No.: 768,745

[22] Filed: Dec. 17, 1996

Related U.S. Application Data

[60] Provisional application No. 60/008,750 Dec. 18, 1995.

[51] Int. Cl.⁶ .................. G11B 17/022; G11B 17/038
[52] U.S. Cl. ........................ 360/99.12; 360/98.08
[58] Field of Search ..................... 360/98.08, 99.12

[56] References Cited

U.S. PATENT DOCUMENTS

| | | | |
|---|---|---|---|
| 4,945,432 | 7/1990 | Matsudaira et al. | 360/98.08 |
| 5,367,418 | 11/1994 | Chessman et al. | 360/98.08 |
| 5,459,627 | 10/1995 | Peter | 360/98.08 |

FOREIGN PATENT DOCUMENTS

| | | | |
|---|---|---|---|
| 4-067377 | 3/1992 | Japan | 360/98.08 |
| 4-195781 | 7/1992 | Japan | 360/98.08 |
| 4-222958 | 8/1992 | Japan | 360/98.08 |

*Primary Examiner*—Craig A. Renner
*Attorney, Agent, or Firm*—Edward P. Heller, III; Raghunath S. Minisandram

[57] ABSTRACT

A disc pack assembly comprises a spindle motor assembly rotatable about a central axis. The spindle motor assembly has a spindle hub, which has at least one ring receiving portion. At least one information storage disc is stacked on the spindle hub and a resilient spacer ring is stacked on top of the information storage disc. A second resilient ring is located in the ring receiving portion of the spindle hub and is adjacent to the inner diameter of the information storage disc. A disc clamp is provided to apply an axial force to center and secure the information storage disc to the spindle hub, such that a portion of the axial force compresses the second resilient ring and forces the outer surface of the second resilient ring to apply a radial force to the information storage disc by radial expansion of the second resilient ring, and a portion of the axial force compresses the resilient spacer ring and forces the inner surface of the resilient spacer ring to apply a radial force to the second resilient ring by radial expansion of the resilient spacer ring, forcing the second resilient ring to further apply radial force to the information storage disc.

4 Claims, 2 Drawing Sheets

DISC CENTERING DEVICE FOR A DISC DRIVE

This application claims the benefit of provisional application No. 60/008,750 filed on Dec. 18, 1995, entitled Disc Clamp and Spacer.

The present invention relates generally to a disc centering device for positioning and retaining rotational information storage discs and spacers concentric to the axis of rotation, within a disc drives.

BACKGROUND OF THE INVENTION

Disc drive machines record and reproduce information stored on a recording media. Conventional Winchester-type disc drives include a plurality of vertically-aligned, rotating information storage discs, each having at least one associated magnetic head that is adapted to transfer information between the disc and an external computer system. The information storage discs are journaled about a spindle motor assembly capable of rotating the discs at high speeds. The heads are carried by a plurality of vertically-aligned, elongated flexure arms that in turn are carried by a head positioner assembly. The head positioner assembly is adapted to move the heads back and forth in unison across the face of the vertically-aligned, elongated flexure arms that in turn are carried by a head positioner assembly. The head positioner assembly is adapted to move the heads back and forth in unison across the face of the vertically-aligned discs. The head positioner assembly are traditionally either rotationally mounted, or take the form of a carriage that is free to move back and forth along a single axis. In either case, the head positioner assembly is adapted to precisely position the heads relative to the magnetic information storage discs.

The spindle motor assembly includes a rotatable spindle hub that is carried by a fixed spindle shaft securely mounted to the housing. A plurality of information storage discs are journaled about the spindle hub. Spacer discs are provided between adjacent information storage discs. The vertically aligned information storage discs are clamped to the spindle hub by a disc clamp secured by a plurality of screws or other means.

Due to advances in read/write heads, head positioner control and servo systems, the density of the data tracks have substantially increased from about 500 tracks per inch (TPI) to over 3000 TPI, allowing smaller diameter disks while increasing storage capacity. Because of this increased track density, however, the importance of rotational trueness of the spindle and information storage discs about a longitudinal axis thereof is magnified. Any wobble, deflection or non-repetitive run-out caused by an imbalanced or offset overall center of gravity from the longitudinal axis can significantly and adversely affect tracking performance. Thus, the spindle motor with plurality of information storage discs secured to the spindle motor hub, such an assembly typically known as disc pack is spin balanced in a manner reducing the combined moment of inertia thereof about the axial axis of rotation to within an acceptable tolerance. Typically weights are added to specific location on the disc pack during spin balancing to correct for any imbalances.

It is well known in the industry to use a centering tool to approximately center the information storage discs and spacers during assembly process and then install a disc clamp which applies a clamp load to hold the information storage discs and spacers in place. Unfortunately, either during the removal of the centering tool or application of clamp load, the information storage discs or the spacers can radially move, thus contributing to the imbalance of a disc pack.

Another way to minimize the imbalance is to have minimal gap between the spindle hub and the inner diameter of the information storage discs. However, in practice, if the information storage discs and the spindle hub physically touch each other, the overall thermal characteristics of the disc pack may be affected. Further, as the disc drives are built to withstand higher operating and non-operating shocks, there is a need to provide some sway space between the information storage discs and the spindle hub.

Further, as alternate clamping means are devised to accommodate for smaller information storage discs, it many not be always possible to use a removable disc centering tool during the assembly process.

Thus, there is a need to come up with a device for use in a disc drive that maintains the information storage discs and spacers concentric with the rotational axis of the disc pack during and after the assembly process.

There is also a need to use a disc centering device that can act as a compliant member between the information storage discs and the spindle hub.

There is also a need to use a disc centering device that can virtually eliminate need for spin balancing a disc pack using weights.

SUMMARY OF THE INVENTION

Accordingly, it is an objective of the present invention to provide a novel disc centering device that positions maintains the information storage devices and the spacers concentric with the axis of rotation of the spindle hub.

It is a further object of this invention to provide a compliant member between the information storage discs and reduce the amount of time required to assemble a disc pack.

It is a further object of this invention to use the axial clamping force that is applied to secure the information storage discs to generate a radial force to apply to the inner diameter of the information storage disc.

To achieve the foregoing and other objects in accordance with the purpose of the present invention, a disc pack assembly is provided for use within a disc drive having a spindle motor assembly rotatable about a central axis, with a spindle hub and a hub flange. The spindle hub has at least one ring receiving portion to receive a novel resilient ring of the current invention. An information storage disc is stacked on the spindle hub and rests on the hub flange. The novel resilient ring of the current invention is placed in the ring receiving portion so that it is held in the ring receiving portion and abuts against the inner diameter of the information storage disc, applying a radial force and centering the information storage disc with respect to said central axis. A second information storage disc is stacked on top of the disc spacer and a second resilient ring of the current invention is placed in another ring receiving portion. A resilient spacer ring is placed on top of the second information storage disc. When a disc clamp is used to secure the information storage discs to the spindle motor, the second resilient spacer ring and the second resilient ring cooperatively operate to apply a radial force to the inner diameter of the second information storage disc so that the second information storage disc is concentric with respect to the central axis.

DETAILED DESCRIPTIONS

Figure 1:
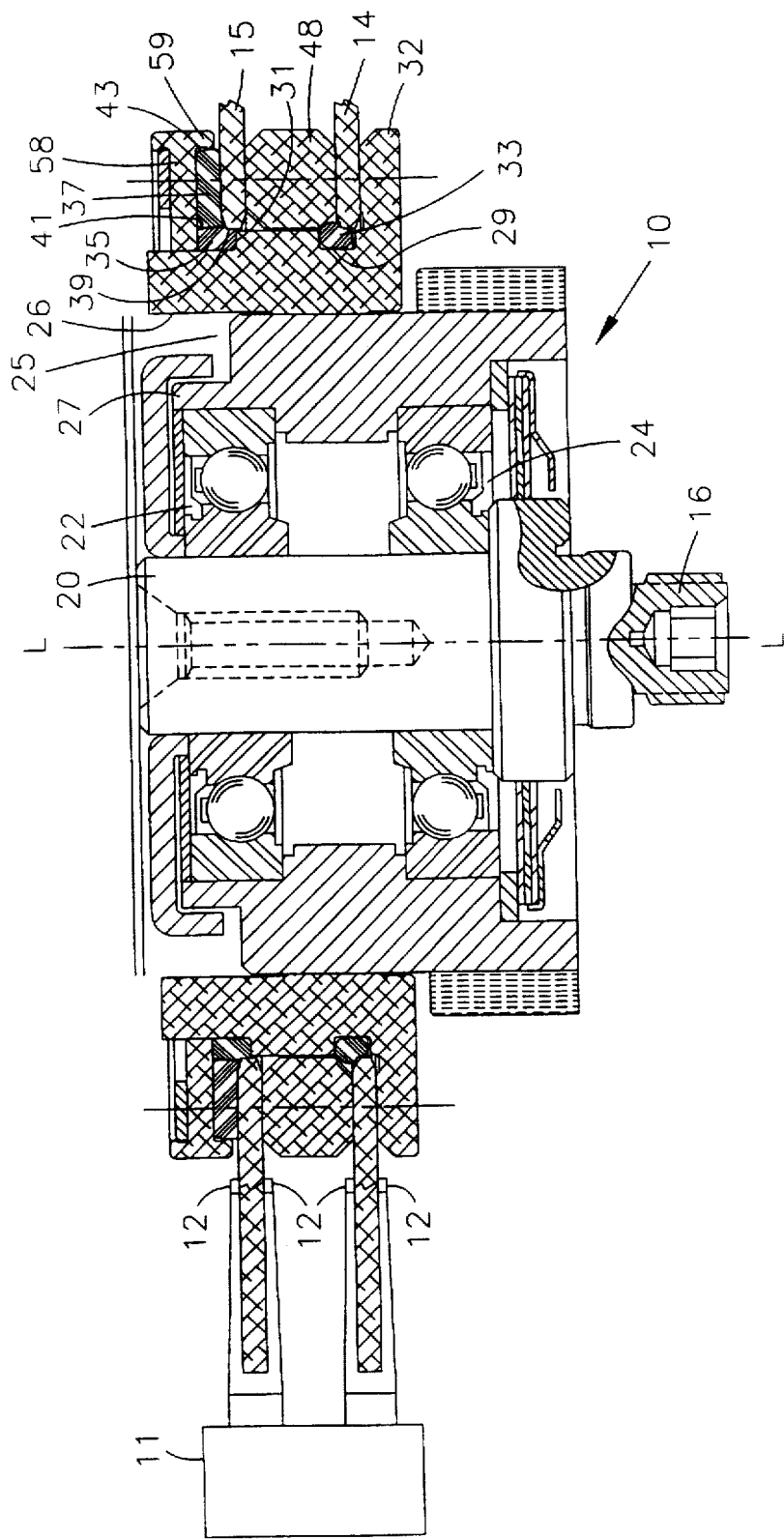
FIG. 1 is a partial sectional elevational view through a partial disc drive unit showing novel disc centering device of the present invention.

As is generally known in the art, the illustrative disc drive unit 10 includes a head positioner assembly 11 mounted within the housing 16 at a position along the disc stack. The head positioner assembly 11 supports a plurality of individual arms having electromagnetic transducer heads 12 at the distal ends there of in close proximity with respective upper and lower surfaces on the information storage disks. A suitable actuator motor 13 such as a movable coil DC motor, and a corresponding motor controller function to displace the magnetic transducer head through generally radial traverses relative to the information storage disks 14 for the purposes of reading and writing data, all in a well known manner.

With reference to FIG. 1, a central shaft 20 having a central axis L—L is securely fixed to a portion of the housing lower base 16, and a plurality of information storage discs are mounted for rotational movement within the housing 16 about the shaft 20. Central shaft 20 is also attached to the inner races of upper bearing and lower bearing.

The outer races of the upper bearing 22 and the lower bearing 24 support the rotor of the spindle motor. The rotor 25 includes sleeve 27 and spindle hub 26. Sleeve 27 is preferably stainless steel and spindle hub 26 is preferably aluminum. Spindle hub 26 is preferably heated and shrink fit over the outer surface of the sleeve 27 to securely attach spindle hub 26 and sleeve 27. The sleeve has a radially and inwardly extending middle flange on which the outer races of the upper bearing 22 and lower bearing 24 rest. The sleeve supports, at its lower end, a plurality of permanent magnets which interact with an electromagnetic stator core to rotate the spindle hub about the center shaft in a known manner.

The spindle hub near the lower end, has a radially and outwardly extending hub flange 32. The spindle hub 26 has a first ring receiving portion 29 and a second ring receiving portion 31. A first information storage disc 14 is stacked on top of the hub flange 32. A first resilient ring 33 of the current invention is slipped over the spindle hub 26 and placed in the first ring receiving portion 29. Upon placement, the first resilient ring 33 pushes the first information storage disc 14 against the hub flange 32 and radially, along the inner diameter of the first information storage disc 14, thus centering the first information storage disc 14 concentric with the central axis L—L. The diameter of the first resilient ring 33 is such that upon placement inside the first ring receiving portion 29, and upon application of a clamp load, the first resilient ring 33 is under minimal compression, yet applying a radial force to the inner diameter of the first information disc 14. A disc spacer 48 is stacked on top of the first information disc 14 and a second information storage disc 15 is stacked on top of the disc spacer 48.

A second resilient ring 35 is slipped over the spindle hub 26 and placed in the second ring receiving portion 31. A resilient spacer ring 37 is placed on top of the second information storage disc 15.

A heat shrunk disc clamp ring 58 secure the information storage discs to the spindle hub as shown while applying an axial clamp load. The features and operation of the disc clamp ring 58 in conjunction with the novel disc centering device of the present invention will be explained below, however, one skilled in the art would readily recognize that alternate disc clamp assemblies could be used to secure the information storage discs to the spindle hubs, while using the novel disc centering device of the current invention. The disc clamp ring 58 has an inner diameter smaller than the outer diameter of the spindle hub 26. So, the disc clamp ring 58 is heated so that it will expand and can be slipped over the outer surface of the spindle hub to apply a clamp load and then cooled, to hold the disc clamp ring 58 tightly against the spindle hub 26, while still maintaining the clamp load.

When the disc clamp ring 58 is slipped over the spindle hub 26 to apply a clamp load, the bottom surface of the disc clamp ring 58 first touches the second resilient ring 35 and starts to compress the second resilient ring 35 in an axial direction. As the clamp load is increased, the outer surface 39 of the second resilient ring 35 starts to bulge in a radial direction and apply a radial force to the inner diameter of the second information storage disc 15. As the clamp load is further increased, the resilient spacer ring 37 is compressed in the axial direction and the inner surface 41 and outer surface 43 of the spacer ring 37 start to bulge in a radial direction. A lower rim portion 59 of the disc clamp 58 will limit the radial expansion of the resilient spacer ring 37, while the inner surface 41 starts to push on the outer surface 39 of the second resilient ring 35, thus forcing the second resilient ring 35 to apply most of the radial force to the inner diameter of the second information storage disc 15.

Figures 2, 2A, 2B:
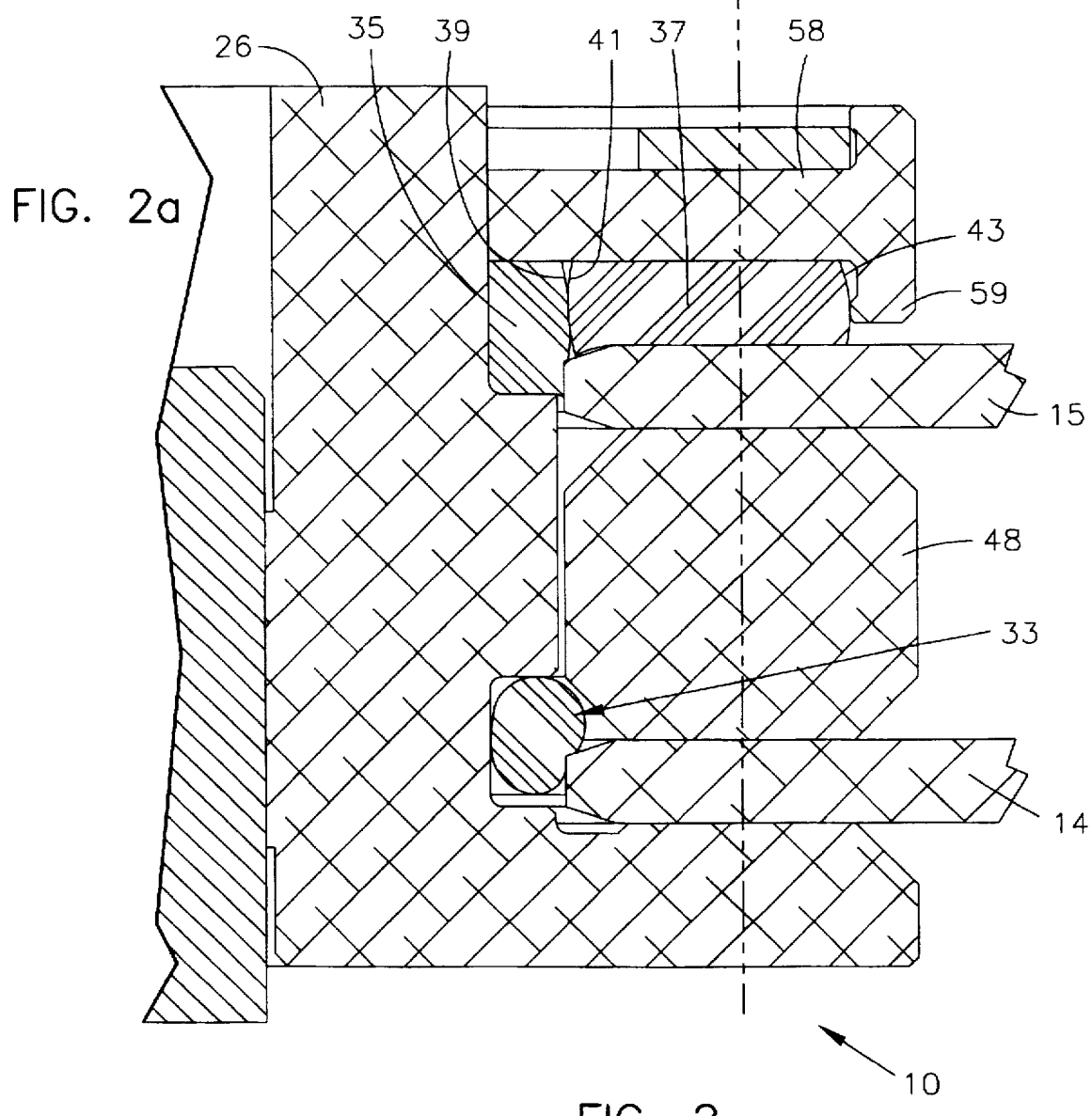
FIG. 2a is a partial sectional elevational view through a disc drive unit showing the second resilient ring and the resilient spacer ring, under clamp load.
FIG. 2b shows the second resilient ring and the resilient spacer ring prior to the application of clamp load.

FIG. 2a is a partial sectional elevational view through a disc drive unit showing the second resilient ring 35 and the resilient spacer ring 37 under full clamp load. FIG. 2b shows the second resilient ring 35 and the resilient spacer ring 37 prior to the application of the clamp load. FIG. 2b shows the uncompressed dimensional relationship between the second resilient ring 35 and the resilient spacer ring 37. In its uncompressed form, the outer surface 37 of the second resilient ring 35 will not touch the inner diameter of the second information storage disc 15, when placed in the second ring receiving portion 31.

The first resilient ring 33, the second resilient ring 35 and the resilient spacer ring 37 are made of an elastomer material. The second resilient ring 35 and the resilient spacer ring 37 can be molded in one piece or cut from extruded tubing in two pieces.

From the above description, it is apparent that many modifications and variations of the present invention are possible in light of the above teachings. It is therefore to be understood that, within the scope of the appended claims, the invention may be practiced otherwise than as specifically described hereinabove.

We claim:

1. A disc pack assembly comprising:
   a spindle motor assembly rotatable about a central axis, said spindle motor assembly having a spindle hub, said spindle hub having at least one ring receiving portion;
   at least one information storage disc stacked on said spindle hub;
   a resilient spacer ring stacked on top of said information storage disc;
   a second resilient ring located in said ring receiving portion of said spindle hub and adjacent the inner diameter of said information storage disc and
   a disc clamp to apply an axial force to center and secure said information storage disc to said spindle hub, a portion of said axial force compressing said second resilient ring and forcing the outer surface of said second resilient ring to apply a radial force to said information storage disc and a portion of said axial force compressing said resilient spacer ring and forcing the inner surface of said resilient spacer ring to apply a radial force to said second resilient ring, forcing said second resilient ring to further apply radial force to said information storage disc.

2. The disc pack assembly of claim 1, wherein said disc clamp further including a lower rim portion, said lower rim portion limiting radial expansion of said resilient spacer ring.

3. A disc drive system comprising:

a plurality of magnetic transducer heads for writing information onto at least one information storage disc and for reading information out from the information storage disc;

a head positioner assembly for positioning the transducer heads relative to the information storage disc and a disc pack assembly comprising:

a spindle motor assembly rotatable about a central axis, said spindle motor assembly having a spindle hub, said spindle hub having at least one ring receiving portion, said information storage disc stacked on said spindle hub;

a resilient spacer ring stacked on top of said information storage disc;

a second resilient ring located in said ring receiving portion of said spindle hub and adjacent the inner diameter of said information storage disc and a disc clamp to apply an axial force to center and secure said information storage disc to said spindle hub, a portion of said axial force compressing said second resilient ring and forcing the outer surface of said second resilient ring to apply a radial force to said information storage disc and a portion of said axial force compressing said resilient spacer ring and forcing the inner surface of said resilient spacer ring to apply a radial force to said second resilient ring, forcing said second resilient ring to further apply radial force to said information storage disc.

4. The disc drive system of claim 3, wherein said disc clamp further including a lower rim portion, said lower rim portion limiting radial expansion of said resilient spacer ring.

\* \* \* \* \*